United States Patent [19]

Su

[11] Patent Number: 5,215,004

[45] Date of Patent: Jun. 1, 1993

[54] DEHYDRATOR FOR VEGETABLES OR THE LIKE

[76] Inventor: Johnson Su, 170 Chung-Lun, Chung-Sha Tsun, An-Ting Hsiang, Tainan Hsien, Taiwan

[21] Appl. No.: 906,493

[22] Filed: Jun. 30, 1992

[51] Int. Cl.$^5$ .................. A23B 4/04; F26B 23/06; F26B 25/18

[52] U.S. Cl. ............................ 99/483; 34/197; 34/238; 99/467; 99/476; 211/188; 219/400

[58] Field of Search ............... 99/447, 448, 449, 468, 99/467, 473, 476, 483; 34/196, 197, 238; 126/21 A; 108/91, 56.3; 219/400, 386; 312/236; 211/188, 153

[56] References Cited

U.S. PATENT DOCUMENTS

| | | | |
|---|---|---|---|
| 2,315,608 | 4/1943 | Fergusson | 108/91 |
| 3,943,842 | 3/1976 | Bills et al. | 99/473 |
| 4,028,816 | 6/1977 | Macy et al. | 34/238 |
| 4,052,589 | 10/1977 | Wyatt | 312/236 |
| 4,065,857 | 1/1978 | Nelson et al. | 99/483 |
| 4,110,916 | 9/1978 | Bemrose | 99/476 |
| 4,190,965 | 3/1980 | Erickson | 34/197 |
| 4,236,063 | 11/1980 | Glucksman | 126/21 A |
| 4,318,230 | 3/1982 | Bacon | 108/56.3 |
| 4,536,643 | 8/1985 | Erickson | 219/386 |
| 4,841,881 | 6/1989 | Battistella | 211/188 |

FOREIGN PATENT DOCUMENTS

| | | | |
|---|---|---|---|
| 2412835 | 9/1975 | Fed. Rep. of Germany | 219/400 |
| 2806989 | 1/1979 | Fed. Rep. of Germany | 34/196 |
| 880989 | 4/1943 | France | 99/476 |
| 1449810 | 1/1989 | U.S.S.R. | 34/238 |

Primary Examiner—Timothy F. Simone
Attorney, Agent, or Firm—Morton J. Rosenberg; David I. Klein

[57] ABSTRACT

A dehydrator for vegetables or the like is provided. The dehydrator includes a base having a heating wire and a concealed plug, a plurality of circular containers engageable each with another, and a cover mountable on top of one of the circular containers. The dehydrator can be collapsed by increasing the engagement between the respective circular containers and inverting the cover, when not in use.

1 Claim, 4 Drawing Sheets

DEHYDRATOR FOR VEGETABLES OR THE LIKE

BACKGROUND OF THE INVENTION

It has been found that the prior art dehydrators are fixed in size, thereby rendering them difficult to store when not in use. Furthermore, such dehydrators occupy a relatively large space, and are therefore inconvenient and expensive to transport.

Therefore, it is an object of the present invention to provide a dehydrator which may obviate and mitigate the above-mentioned drawbacks.

SUMMARY OF THE INVENTION

This invention relates to an improved dehydrator.

It is the primary object of the present invention to provide a dehydrator which may be collapsed when not in use.

It is another object of the present invention to provide a dehydrator which is easy to store.

It is still another object of the present invention to provide a dehydrator which facilitates transportation.

It is still another object of the present invention to provide a dehydrator which is simple in construction.

It is a further object of the present invention to provide a dehydrator which is economic to produce.

Other objects and merits and a more full understanding of the present invention will be obtained by those having ordinary skill in the art when the following detailed description of the preferred embodiment is read in conjunction with the accompanying drawings.

DETAILED DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
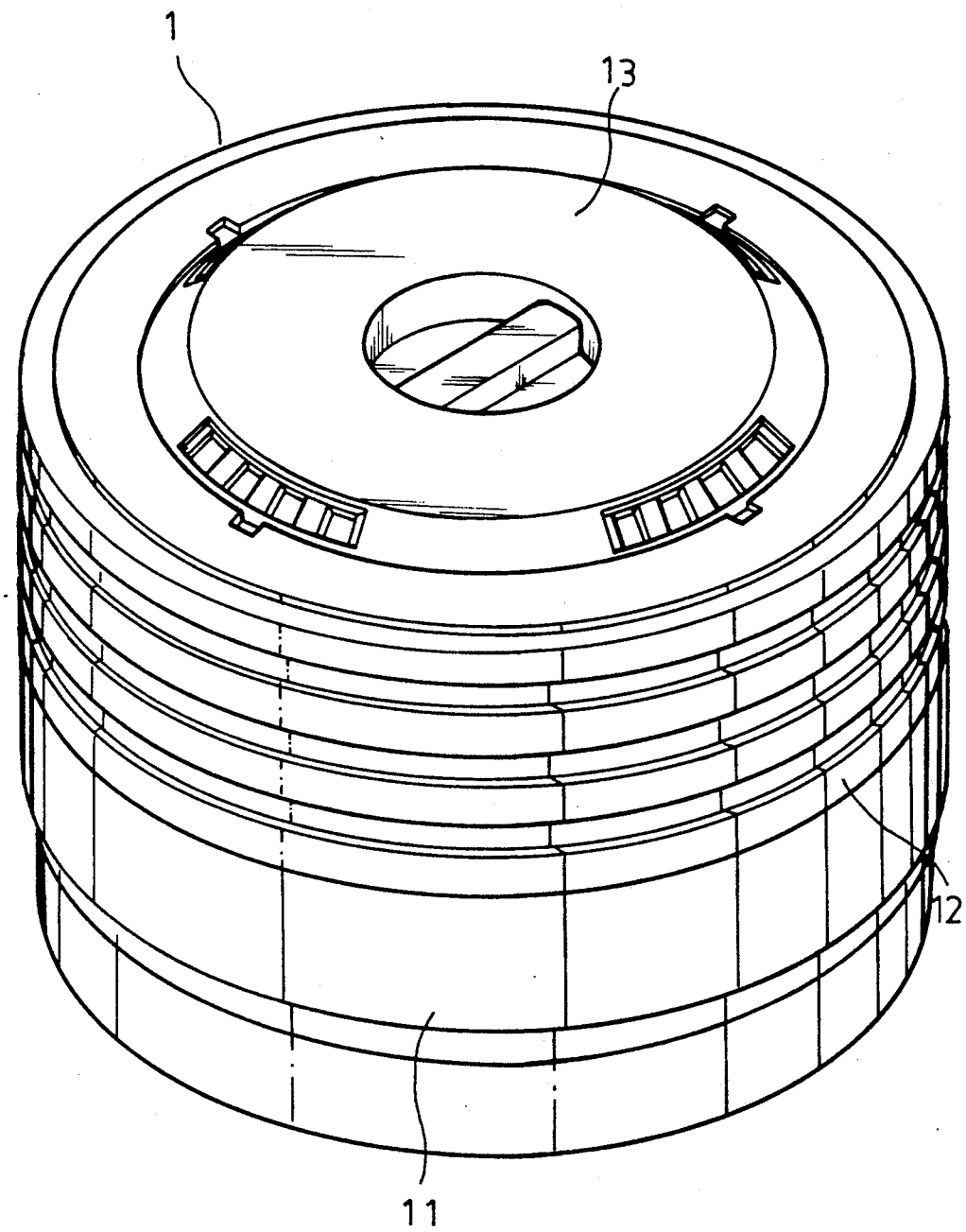
FIG. 1 is a perspective view of the present invention.
Figure 2:
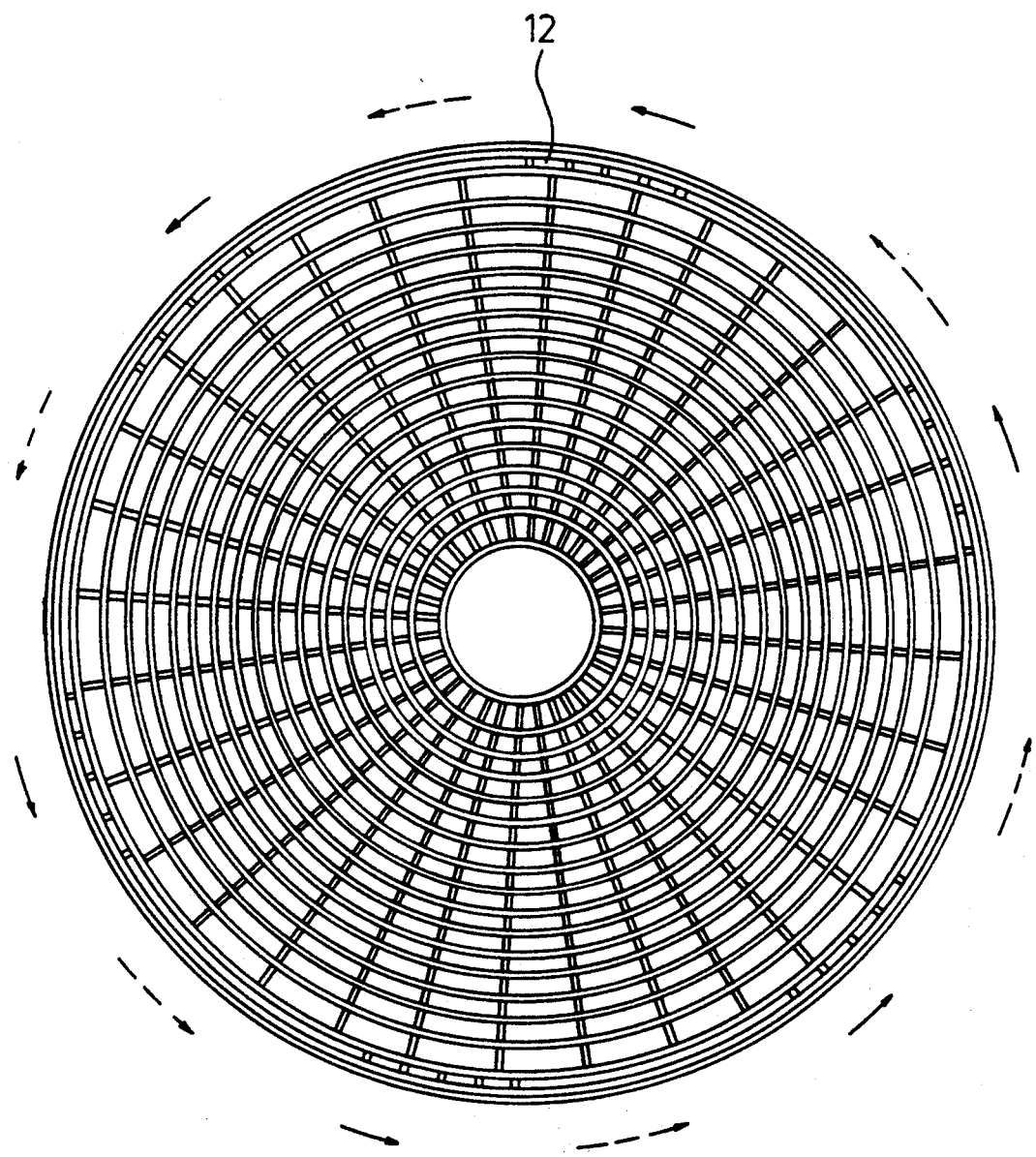
FIG. 2 shows the present invention being turned to collapse.
Figure 3:
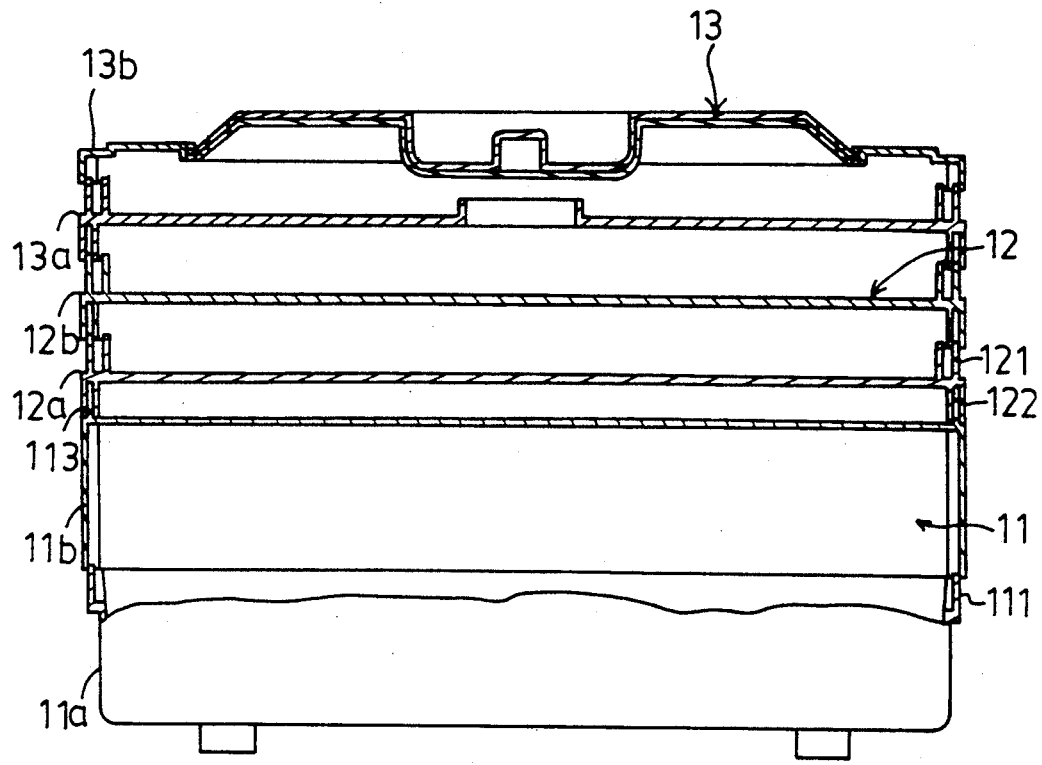
FIG. 3 is a sectional view of the present invention.
Figure 4:
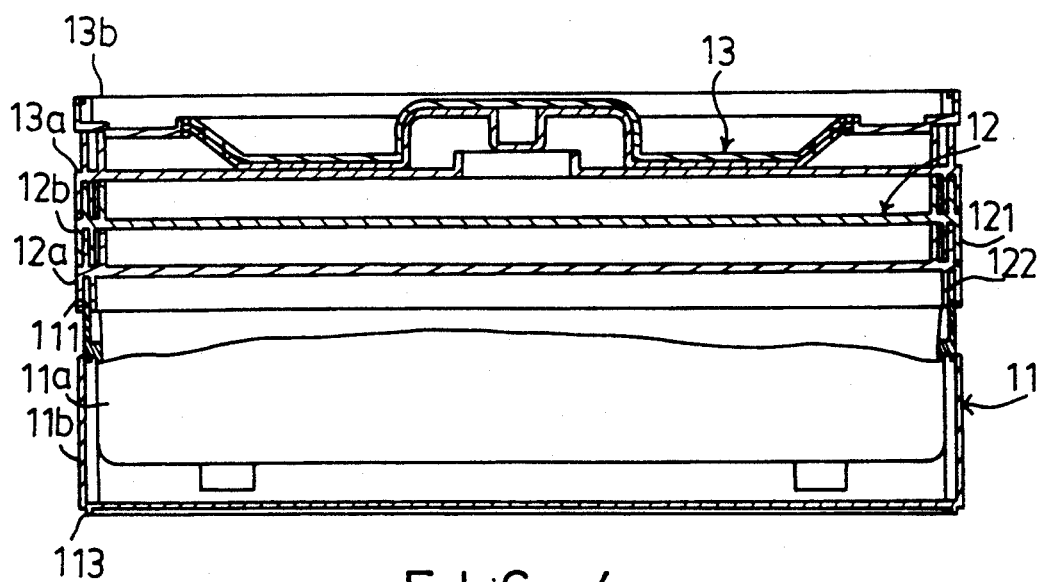
FIG. 4 is a sectional view showing the collapsed state of the present invention.
Figure 5:
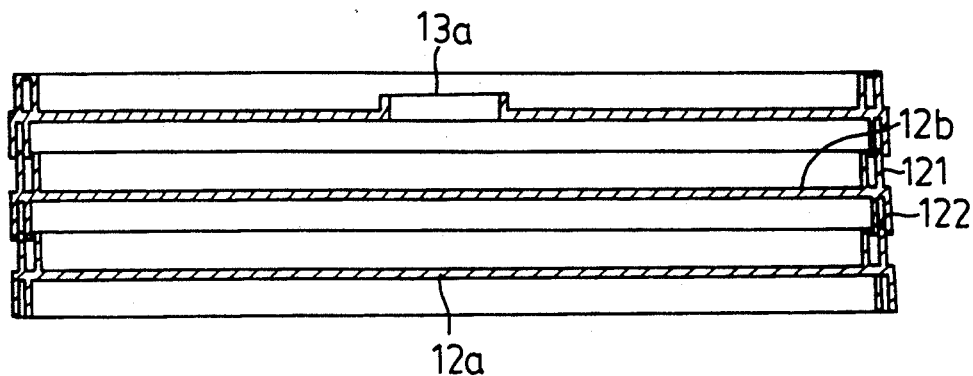
FIG. 5 is a sectional view showing the expanded state of the present invention.
Figure 6:
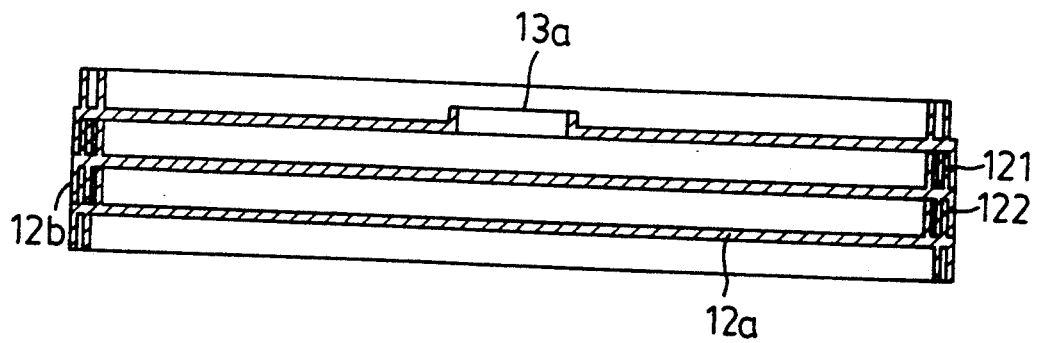
FIG. 6 is a sectional view showing the collapsed state of the present invention.

With reference to the drawings and in particular to FIGS. 1 and 2 thereof, the dehydrator 1 according to the present invention mainly comprises a cover 13a, 13b, a base 11a, 11b and a plurality of circular containers 12a, 12b. In the base 11 there is provided a heating wire and a concealed plug (not shown). Further, the base portion 11a is provided with an annular protuberance 111 (see FIGS. 3 and 4) on its top edge for engaging with corresponding recess 122 formed on the lower container portion 12a of the circular container 12 in the collapsed position. The upper portion 11b of the base has an annular protuberance 113 for engagement with corresponding recess 122 when the dehydrator is to be used. The upper side of each of the circular containers is provided with a pair of concentric annular protuberances 121, the outermost one of which is adapted to be frictionally engaged within a recess 122 formed on the lower side of another circular container 12 or lower cover member 13a.

When not in use, the circular containers 12a, 12b and cover member 13a are rotated while being pushed downwardly to further engage the protuberances 121 into the respective recesses 122, and the cover member 13b is disposed inverted on the cover member 13a. The base portion 11b is inverted and interposed with base portion 11a, base portion 11a being inserted into portion 11b, thereby decreasing the volume of the dehydrator and therefore facilitating the storage thereof.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:

1. A dehydrator comprising:
   a first base member having a first annular protuberance extending from an upper edge thereof;
   a second base member having a cylindrical wall and a second annular protuberance extending from an upper edge thereof, said second base member having a lower open end defined by said cylindrical wall, said second base member being positionable in a first position with said cylindrical wall at said lower open end being disposed in contiguous relation with said first annular protuberance of said first base member, said second base member being positionable to a second position with said second protuberance being disposed in a downward direction and said first base member being insertable into said open end of said second base member;
   a plurality of cylindrical container members disposed in stacked relation one upon another, each of said plurality of cylindrical container members having a first annular recess formed on a lower side thereof, and a pair of third annular protuberances extending from an upper side thereof in spaced concentric relation, said annular recess of one of said plurality of cylindrical container members being engaged with said second annular protuberance of said second base member when said second base member is in said first position, said annular recess of said one of said plurality of cylindrical container members being engaged with said first annular protuberance of said first base member when said second base member is in said second position, each one of a remaining portion of said plurality of cylindrical container members being in stacked relation having a respective outermost one of said third protuberances engaged with a respective first annular recess of a container member disposed thereon;
   a first cover member disposed on an uppermost one of said plurality of container members and having a second annular recess formed on a lower side thereof for engagement with an outermost one of said third protuberances of said uppermost container member, said first cover member having a pair of fourth annular protuberances extending from an upper side thereof in spaced concentric relation; and a second cover member having a lower side positioned on said first cover member, said second cover member being positionable within said first cover member when said second cover member is rotated to position said lower side upwardly, said stacked plurality of container members being collapsible by application of both rotatable and downward forces to thereby increase a depth of engagement of said third protuberances within respective recesses.

* * * * *